COLLOIDAL LIQUID

INVENTORS:
FRANK E. GARBUTT,
RALPH G. FEAR,
BY
Graham + Harris
ATTORNEYS.

Patented Sept. 20, 1927.

1,642,772

UNITED STATES PATENT OFFICE.

FRANK E. GARBUTT AND RALPH G. FEAR, OF LOS ANGELES, CALIFORNIA, ASSIGNORS TO FAMOUS PLAYERS-LASKY CORPORATION, A CORPORATION OF NEW YORK.

PROCESS OF AND APPARATUS FOR ELIMINATING GRANULAR EFFECTS IN PHOTOGRAPHIC ENLARGEMENTS.

Application filed March 10, 1923. Serial No. 624,281.

Our invention relates to the art of making photographic enlargements and is particularly adapted for use in connection with projection printers for motion picture film in which it is desired to provide a considerable enlargement of the film to be produced as compared to the film from which the enlargement is made. It sometimes happens that the motion picture camera man is unable to get sufficiently near to the objects to be photographed to get an image of suitable proportions or in many other cases the camera man or those directing him may fail to show good judgment in selecting this distance. In such cases, it is highly desirable that the images on the film be enlarged; in some cases it is desired to make this enlargement very pronounced. For example, it may be thought desirable to enlarge the figure of one actor of a scene so that he appears as a close up only showing his head or a larger portion of his body. It is possible to so enlarge an ordinary motion picture film by the use of a projection printer, but in so enlarging the film all the granular imperfections of the film are also enlarged which detracts from the effect of the enlargement and is otherwise objectionable.

It is an object of our invention to provide means by which the bad effects of such granular enlargements may be to a large measure prevented.

Further objects and advantages will be made evident hereinafter.

Referring to the drawings which are for illustrative purposes only:

Figure 1:
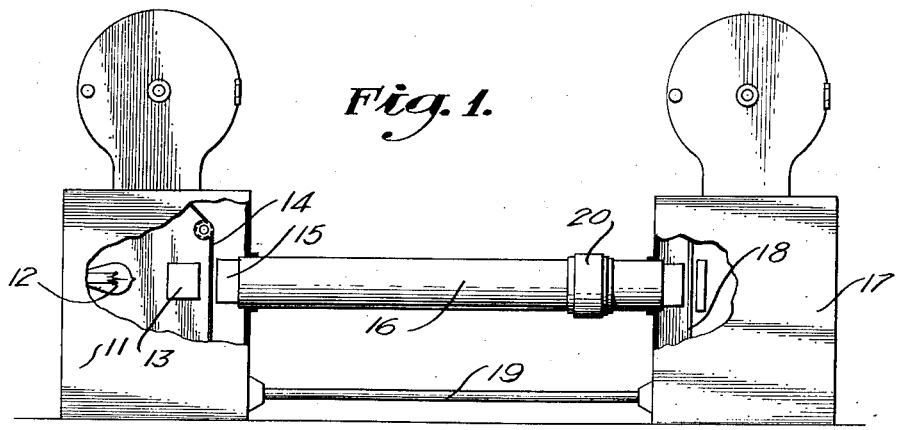
Fig. 1 is a somewhat diagrammatic representation of a projection printer in which our invention is embodied.

In the form of the invention shown in the drawings, we provide a projection printer consisting of a lamp house 11 in which is placed a luminous source 12, a condenser lens system 13, the film to be enlarged 14, and a projection lens system 15. The image of the film 14 is projected through a tube 16 into a house 17 in which the film 18 to receive the enlargement is placed. The two films 18 and 14 are intermittently and synchronously driven by means of a connecting shaft 19. The projection printer consisting of the elements 11 to 19 inclusive is diagrammatically shown and is merely selected as typical of an arrangement which does not constitute the invention claimed herein. Such a printer, when used on enlargements, will often produce enlargements in which the granular effect of the emulsion on the film 14 is extremely marked on the enlarged image on the film 18, when the latter film is finally developed. Our invention is especially directed to the reduction and elimination of this granular effect.

Figure 2:
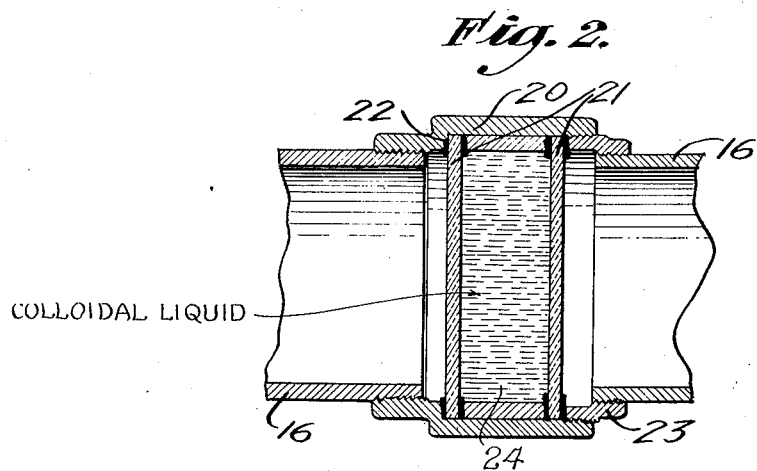
Fig. 2 is a sectional elevation on a larger scale than Fig. 1 of a portion of the apparatus disclosed therein.

For this purpose we insert in the tube 16 a structure shown in Fig. 2 in which 20 is a casing in which two glass discs 21 are clamped between a shoulder 22 and a threaded member 23. The space between the discs 21 is filled with a colloidal liquid which is translucent and nearly transparent. This liquid may be a gelatine solution or it may be any colloidal solution which is devoid of added coloring matter and is incapable of functioning as a ray filter.

This solution has the effect of softening the outlines of the image projected therethrough and thus it eliminates the grain effect which would otherwise be extremely noticeable in enlargements made in the manner above described.

We claim as our invention:

1. In combination, in an apparatus for producing a photographic enlargement of a primary film upon a secondary film: a casing; a pair of transparent members spaced apart within said casing; and a light-transmitting medium between said transparent members, said medium being a colloid in suspension in a liquid and adapted to eliminate granular effect.

2. An apparatus as in claim 1 in which said transparent members comprise glass discs.

3. A process of modifying a projected image which comprises: passing said image through a colloidal medium devoid of added coloring matter.

In testimony whereof, we have hereunto set our hands at Los Angeles, California, this 3rd day of March, 1923.

FRANK E. GARBUTT.
RALPH G. FEAR.